Aug. 19, 1941.  G. E. PORTER  2,253,305
AUTOMOTIVE VEHICLE BRAKE SYSTEM
Filed Aug. 29, 1938  5 Sheets-Sheet 5
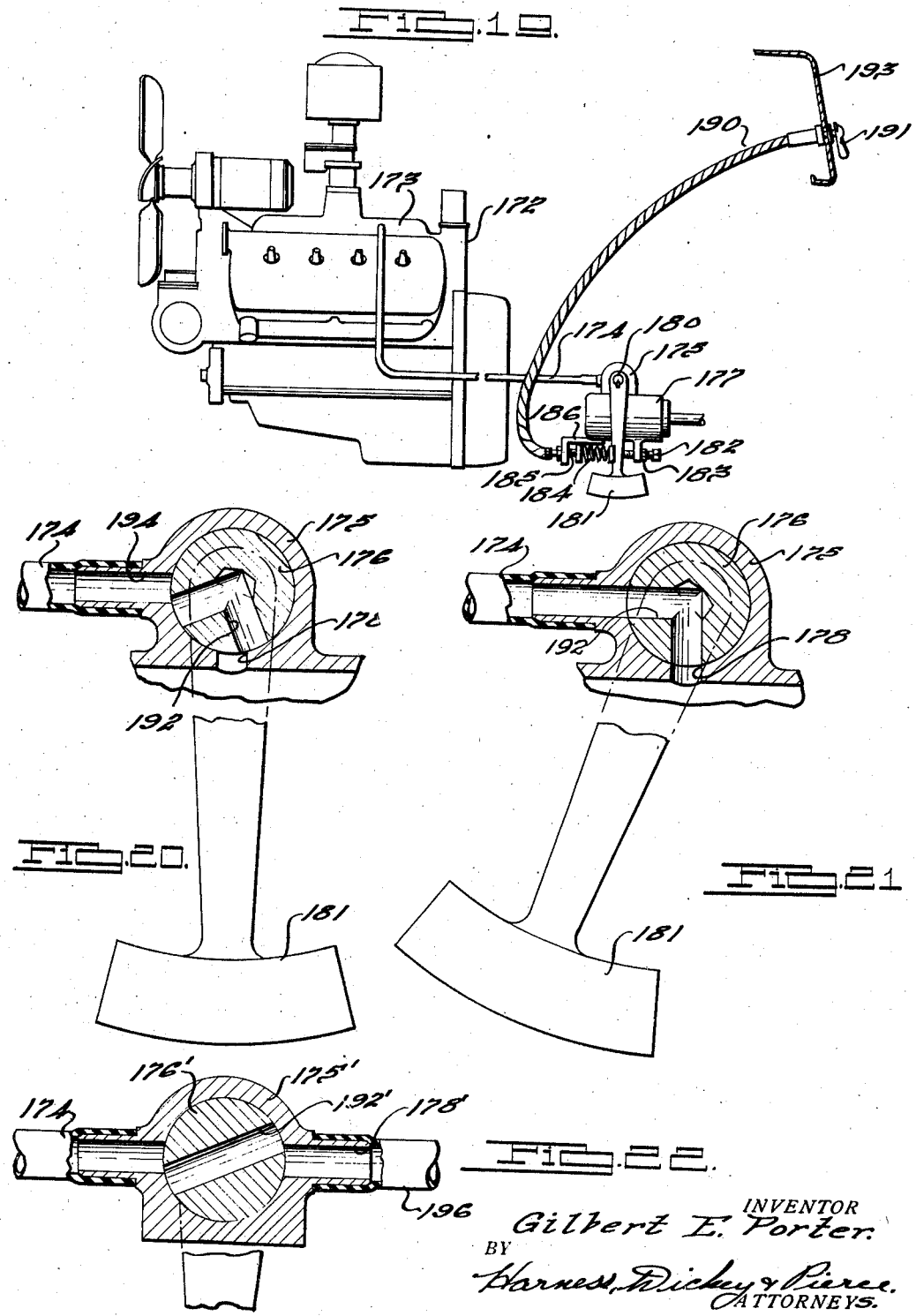
INVENTOR
Gilbert E. Porter
BY
Harness, Dickey & Pierce.
ATTORNEYS.

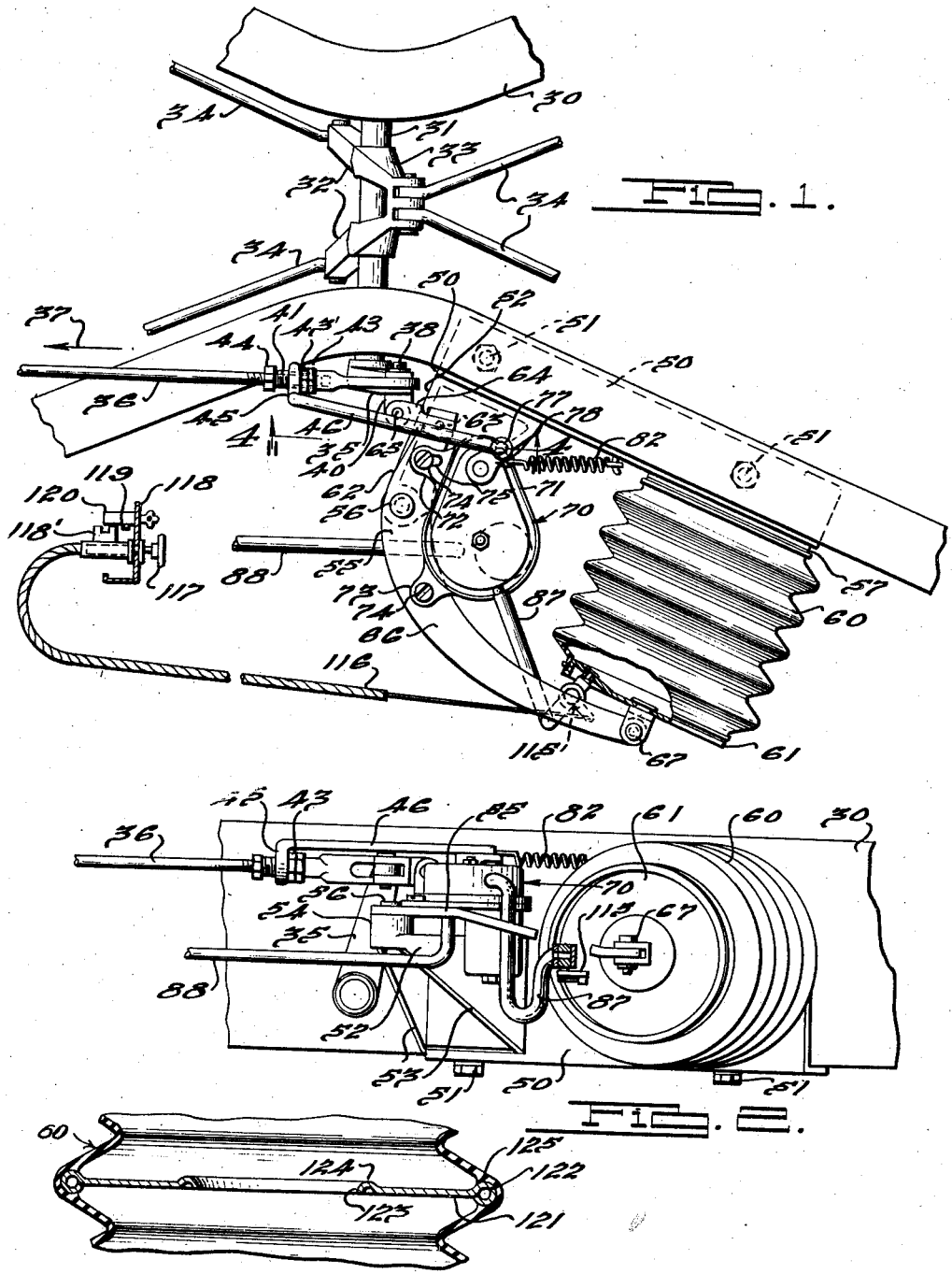
Aug. 19, 1941.   G. E. PORTER   2,253,305
AUTOMOTIVE VEHICLE BRAKE SYSTEM
Filed Aug. 29, 1938   5 Sheets-Sheet 1
INVENTOR
Gilbert E. Porter.
BY
Harness, Dickey & Pierce.
ATTORNEYS.

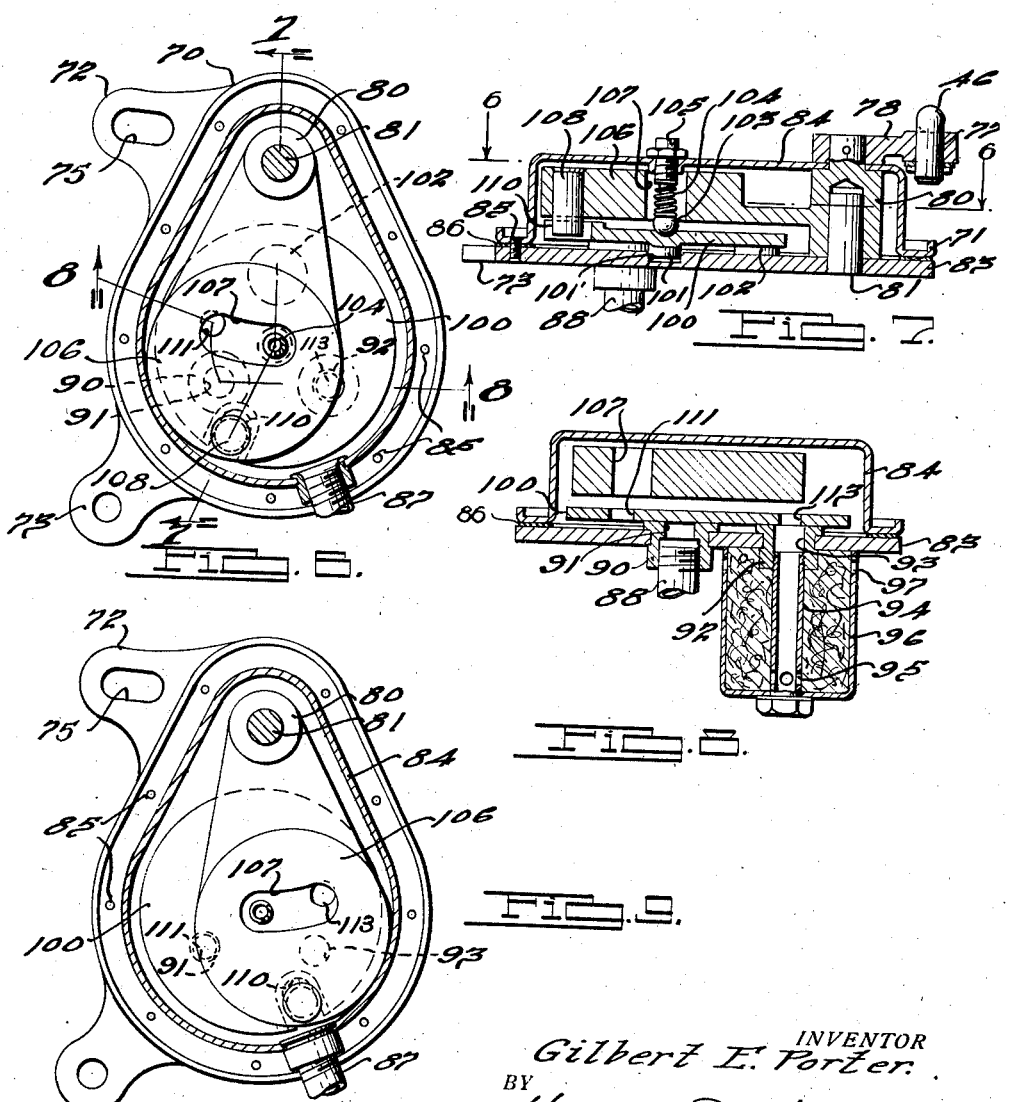

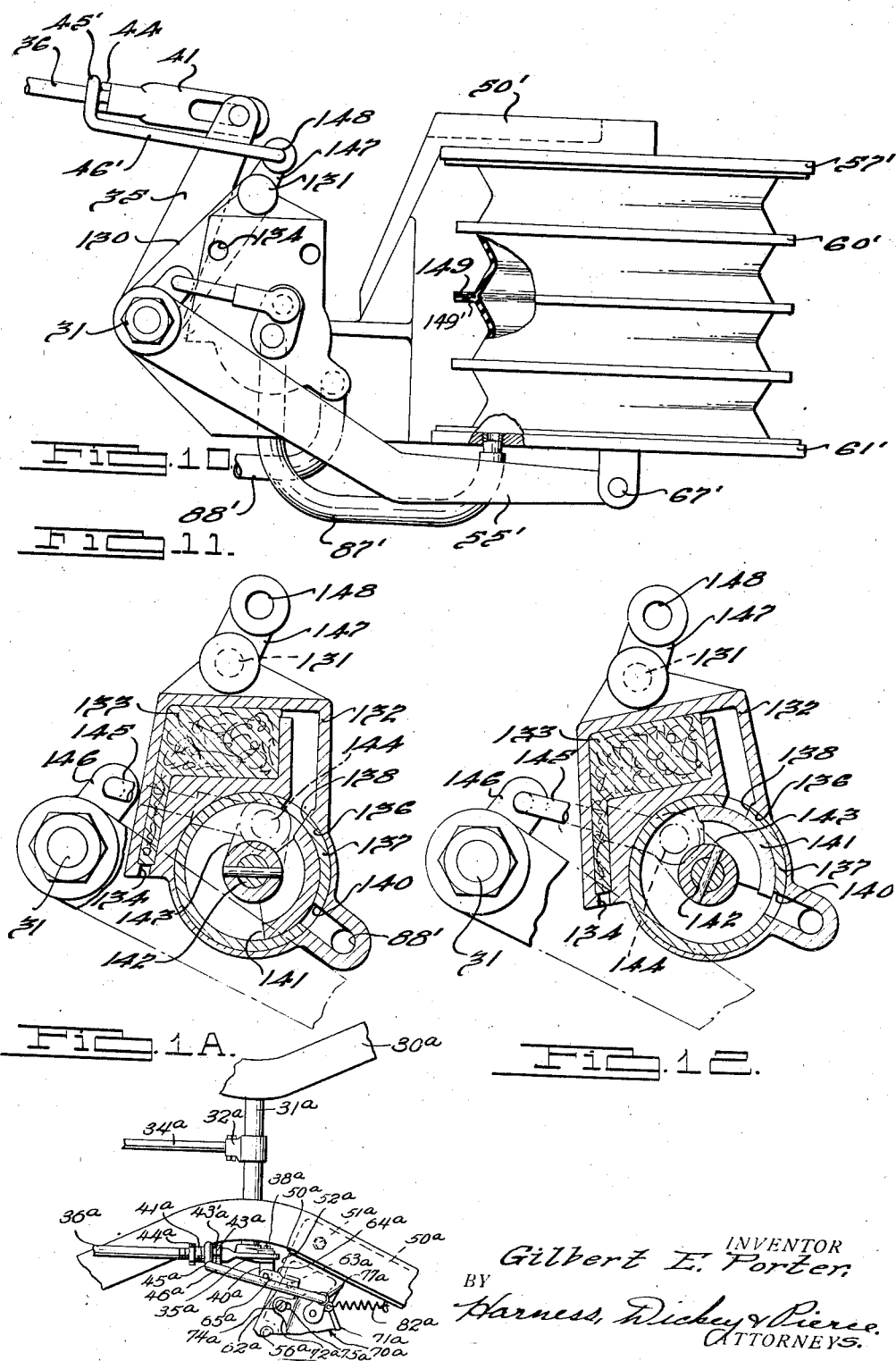

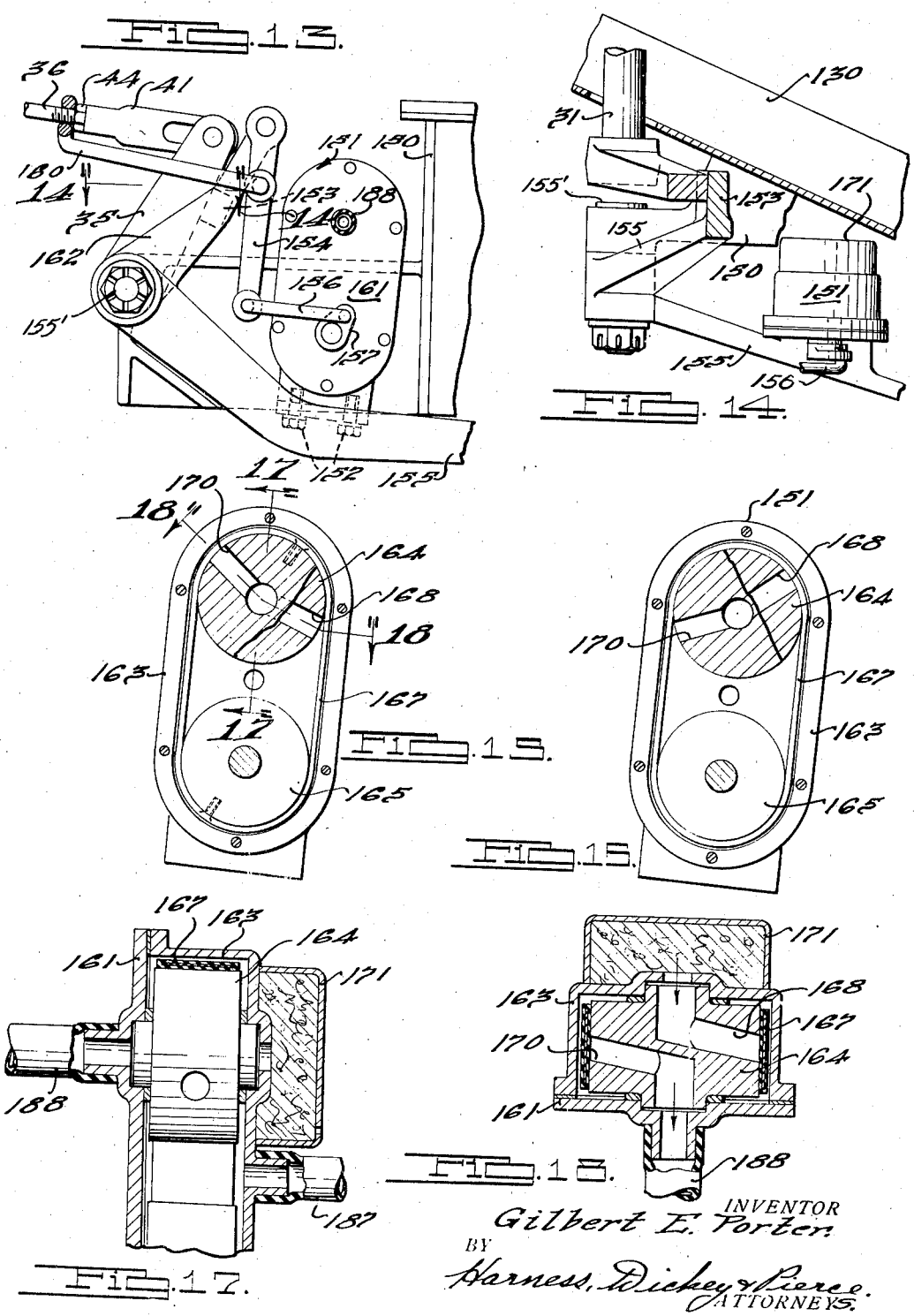

Patented Aug. 19, 1941

2,253,305

UNITED STATES PATENT OFFICE 2,253,305

AUTOMOTIVE VEHICLE BRAKE SYSTEM

Gilbert E. Porter, Mount Clemens, Mich., assignor, by mesne assignments, to Power Devices Development Company, East Detroit, Mich., a corporation of Michigan Application August 29, 1938, Serial No. 227,248

11 Claims. (Cl. 188—152)

This invention relates to control means and more especially to power actuated brakes and clutch mechanism for automotive vehicles.

It is an object of the invention to improve the art of brakes and/or clutch operating and control mechanism.

Another object is to produce a power unit for clutches and/or brakes which can be assembled as a unit and such units readily connected to an automotive vehicle.

A further object is to provide a servo-motor mechanism which provides a cushioning means for applying an operating force to a controlled hand operated mechanism, so as to insure smoothness of operation of the latter.

Another object is to provide in conjunction with a servo-motor mechanism inertia actuated mechanism for insuring smoothness of operation of a controlled mechanism and for exerting an indicating reactive force upon a manual actuator or control.

It is also an object of the invention to provide an improved construction of bellows for a servo-motor mechanism for automotive vehicles.

Another object is to reduce to a minimum the number of operating parts of a servo-motor mechanism and control means therefor.

A further object is to enhance the safety of brake applying mechanism by providing for ample application of power for rapid stopping of an automotive vehicle, while affording a cushioning action in applying such power and by providing a slackening in the application of such power in response to deceleration of the vehicle.

Another object is to provide a servo-motor mechanism for service brakes of an automotive vehicle with mechanism for retaining the brakes in applied position for brake purposes.

Still another object is to provide an improved valve and valve control means for servo-motor control mechanism for automotive vehicles.

A further object is to provide inertia and a gravity actuated mechanism for controlling the operation of power brakes mechanism.

Another object is to provide manual means for adjustably varying the effect of such inertia and gravity actuated means upon the power brake mechanism.

Other objects, features, and advantages will become apparent from the following description and appended claims.

For the purpose of illustrating the genus of the invention, reference may be had to the accompanying drawings, in which:

Figure 1 is a top plan view of brake actuating and control mechanism constructed in accordance with the principles of this invention;

Fig. 1A is a fragmentary top plan view similar to that shown in Fig. 1 but illustrating the application of the present invention to a clutch actuating and control mechanism.

Fig. 2 is a side elevation of the mechanism shown in Fig. 1;

Fig. 3 is an enlarged detailed central section of a bellows element shown in Figs. 1 and 2;

Fig. 4 is an enlarged section taken substantially on the line 4—4 of Fig. 1;

Fig. 5 is a similar view taken substantially on the line 5—5 of Fig. 4;

Fig. 6 is an enlarged horizontal section taken substantially on the line 6—6 of Fig. 7, certain valve parts being shown in normal or non-actuating position;

Figs. 7 and 8 are enlarged vertical sections taken substantially on the lines 7—7 and 8—8 of Fig. 6;

Fig. 9 is a view similar to Fig. 6 with the parts of the valve mechanism in brake operating position;

Fig. 10 is a side elevation of a modified form of brake actuating and control mechanism constructed in accordance with the principles of this invention;

Figs. 11 and 12 are enlarged and substantially central vertical sections taken through the valve mechanism shown in Fig. 10, with the parts in normal or non-actuating and in brake actuating positions, respectively;

Fig. 13 is a side elevation of further modified valve mechanism and control means therefor which may be employed in the present control system for brakes and/or clutches;

Fig. 14 is a vertical section taken substantially on the line 14—14 of Fig. 13;

Figs. 15 and 16 are enlarged side elevations of the valve construction, with cover plates removed and disc parts broken away and in section, illustrated in Fig. 13, said valve parts being disposed in non-actuating and operating positions, respectively;

Figs. 17 and 18 are enlarged sections taken substantially on the lines 17—17 and 18—18 of Fig. 15;

Fig. 19 is a side elevation of an internal combustion engine provided with gravity and inertia actuatable mechanism for controlling the operation of booster mechanism for brakes and/or clutches of an automotive vehicle;

Figs. 20 and 21 are enlarged side elevations of the valve construction shown in Fig. 19 with parts broken away and in section, the valve parts being shown in non-actuating and operating positions, respectively; and, Fig. 22 is a view similar to Fig. 20 of a modified form of valve mechanism which could be employed in the embodiments shown in Figs. 19 to 21.

In the application of power operators to control, such as clutch or brakes of an automotive vehicle, it has not been the practice, in so far as I am aware, to make a simple and compact unit which may be readily attached to the frame of the vehicle and simply connected by links to the manual actuator and the controlled mechanism. The present mechanism contemplates the provision of a simple and compact sub-assembly including all of the potential operating and control mechanism for such power actuator, which can be easily and rapidly secured to the vehicle frame and connected to manual actuators and control mechanism. The invention also contemplates the provision of various safety features in order to provide a cushioning action in applying an operating force to insure movements of operation and means for easing or tapering off the applied force at certain times for also insuring movements of operation of a controlled or operated mechanism. The invention also contemplates the provision in power actuated mechanism, particularly adapted for brakes, of means for retaining the serviced brakes in applied condition for parking brake purposes. The invention further contemplates inertia operated or inertia and gravity actuated means for controlling the operation of a power unit.

Referring to the drawings, more especially to Figs. 1 and 2, a portion of a chassis frame 30 is shown as journalling a brake cross-shaft 31 to which is fixed upwardly and downwardly extending arms 32 and 33, connected by rods 34 to the wheel brakes of the motor vehicle. A shaft 31ᵃ and a single arm 32ᵃ, in conjunction with an operating rod such as 34ᵃ, as illustrated in Fig. 1A also represents clutch operating means in case the present power actuator is employed in conjunction with clutches instead of brakes. In Fig. 1A all parts are identical to those shown in Fig. 1 except for the operating arm 32a and rod 34a and are indicated by the same numerals as in Fig. 1 with the addition of the sub-letter a. The rod 34a is operatively connected to a suitable or conventional clutch (not shown) for controlling the operation thereof in a conventional manner. Further explanation of the application of the invention to clutches will not be necessary for those skilled in the art in view of the following description. The lower end of the cross-shaft 31, as viewed in Fig. 1, has fixed thereto an operating arm 35, which is pivotally connected to an actuator rod 36 adapted to be moved in the direction indicated by the arrow 37 for manual application of the wheel brakes. The arrow 37 also indicates generally the direction of forward motion of the automotive vehicle. The conventional pivot pin connection between the arm 35 and link 36 has been replaced by a pivot pin 38 provided at its head end with an ear member 40, as indicated more clearly in Figs. 1, 4, and 5. The ear 40 affords a pivotal connection between the power actuator and the manual actuator and brake systems.

Threaded to the end of the actuator rod 36 is a more or less conventional knuckle 41 provided with a slot 42 adapted slidably to receive the pin 38 so as to afford the usual lost motion connection between the actuator rod 36 and the power actuator assembly, later described. The knuckle 41 is provided with shoulder nuts 43 and 43' spaced from the end thereof and a lock nut 44 threaded on rod 36 is adapted to abut such end in order to lock the knuckle 41 in the desired adjusted position upon the actuator rod 36. The shoulder nuts 43 and 43' for knuckle 41 and the lock nut 44 also afford a lost motion connection for a loop 45 for valve actuator rod 46. The lost motion gap between the lock nuts 44 and 43' may be adjusted if adjustment is desired at this point by adjustment of the lock nut 43' on the knuckle 41. The effective length of the actuator rod 36 may be adjusted by adjusting the position of the knuckle 41 thereon and the latter locked in adjusted position by means of lock nut 44.

The power actuator mechanism preferably takes the form illustrated generally in Figures 1 and 2 and comprises a bracket 50 adapted to be rigidly secured to the frame 30 by means of bolts 51. The bracket 50 is provided with a substantially normally extending arm 52 which is reinforced by a pair of outwardly converging webs 53 and terminates in a pivot boss 54 to which the main lever 55 of the power actuator is pivotally connected by means of a pin 56. The end of the bracket 50 opposite the end from which arm 52 extends has fixed thereto a stationary end element 57 of a bellows which also includes a diaphragm 60 and a movable end element 61, the bellows extending generally in the same direction as arm 52 from the bracket 50. The main lever 55 of the power actuator is pivoted at a point intermediate its length by means of the pin 56 to the arm 52 of bracket 50. This provides the lever 55 with a relatively short power arm 62 extending between the pivot 56 and a pivot pin 63 connected by means of a link 64 to the pivot pin 38 which, as previously mentioned, connects the actuator rod 36 to the brake arm 35. The pivot pin 65 connects the link 64 with the ear portion 40 of pivot pin 38. The other arm 66 of the main lever 55 of the power actuator is about three and one-half to four times the effective length of the power arm 62 and extends from the pivot pin 56 to a pivotal connection 67 between the remaining end of the main lever 55 of the power actuator and the movable element 61 of the bellows member.

A control valve, indicated generally at 70, comprises a casing 71, generally pear-shaped in horizontal section as indicated in Figures 1, 6 and 9, and is provided with ears 72 and 73 for attachment of the valve casing by means of screws 74 to the main lever 55 of the power actuator, such connections being made on both sides of the pivot 56. The ear 72 is provided with a slot 75 through which the corresponding screw 74 projects so as to permit adjustment of the position of the valve means 76 on the main lever 55 of the power actuator about the remaining screw 74 as a pivot. The valve control link 46 is pivotally connected at 77 to the end of a valve operating arm 78 which is fixed to a shaft 80 journalled for rotation on a pin 81 within the valve casing as indicated in Fig. 7. A spring 82 is arranged in tensioned condition between the bracket 50 and the valve operating arm 78 and constantly tends to rotate the latter in a clockwise direction as viewed in Figs. 1, 6 and 9 in order to urge the valve parts toward the non-actuating position indicated in Figure 6.

Reference may now be had to Figures 1 to 9, inclusive, with reference to which the construction of the valve mechanism will be explained. The valve casing 71 comprises a base plate 83 and a cover member 84 adapted to be secured together by means of screws 85 with a gasket 86 interposed therebetween. A flexible conduit 87 connected to the valve cover 84 and the movable element 61 of the bellows affords communication between the interior of the valve means 70 and the interior of the bellows. A second flexible conduit 88 leads from a suitable vacuum source to a fitting 90 projecting through and secured to plate 83 to afford communication between the source of vacuum and the port 91 in fitting 90. The source of a vacuum may be the intake manifold of the internal combustion engine of the vehicle, a portion of the exhaust system of the vehicle in which vacuum conditions exist may be created, or a vacuum pump or similar vacuum creating means operable by the internal combustion engine of the vehicle. A fitting 92 provides a port 93 through the base plate 83 and to the fitting is threaded a hollow bolt 94, perforated as indicated at 95. The hollow bolt 94 secures a cup 96, provided with openings 97 and filled with mineral wool or similar material in order to provide an air cleaner. The vacuum port 91 and air or atmosphere ports 93 are controlled by a valve 100 which is indicated in Figures 6 and 9 as in the form of a disc, provided with an axially extending boss 101 extending downwardly into a recess 101' in the base plate 83. A bearing boss 102 is provided on the upper surface of the base plate 83 and the upper surface of this bearing boss is flush with the upper surfaces of the fittings 90 and 92, so that the disc valve 100 will make an even bearing thereon. The valve disc 100 is pressed downwardly against the upper surface of the bearing boss 102 and the upper surfaces of the fittings 90 and 92 by means of an anti-friction ball 103, a spring 104, and an adjusting screw 105 for adjusting the downward pressure of the valve disc and preventing undesired leakage through the ports 91 and 93.

The valve disc 100 is adapted to be operated by means of an inertia member 106 which is preferably integral with the hollow shaft 80 to which the valve operating arm 78 is fixed. The inertia member 106 is slotted, as indicated at 107 in Figures 6 to 9, so that operation of such inertia member will not be interfered with by the anti-friction ball 103, spring 104, and adjusting screw 105. Adjacent its outer end, the inertia member 106 is provided with a downwardly extending pin 108 which cooperates with a radially extending slot 110 in the valve disc 100 for effecting rotation of the latter.

As previously indicated, the spring 82 constantly tends to rotate the valve operating arm 78 and the inertia member 106 in a clockwise direction, as viewed in Figures 1, 6 and 9, and normally maintains the inertia member in the position indicated in Figure 6. In this position, the valve disc 100 has a port 113 which registers with the port 93 to admit air through the air cleaner to the interior of the valve casing 71. The registration of the ports 113 and 93 is shown in Figures 6 and 8. The valve disc 100 is provided with a second port 111 extending therethrough and adapted to register with the port 91 when the inertia member and valve discs are in the positions indicated in Figure 9. This is the operating position in which ports 93 and 113 are not in registration so that atmosphere is cut off but ports 91 and 111 are in registration admitting vacuum conditions to exist within the valve casing 71 and through the flexible conduit 87 to exhaust the interior of the bellows 60. The inertia member 106 and the valve disc 100 are swung from the position indicated in Fig. 6 to the position indicated in Fig. 9 in response to movement of the brake pedal rod 36 in the direction indicated by the arrow 37, which causes the nut 43' to pick up the loop 45 of connecting link 46 and to rotate the valve operating arm 78 and inertia member 106 in a counter-clockwise direction and thus rotate the valve discs 100 in a similar direction to bring the parts to the position indicated by Fig. 9. It is noted at the initiation of this movement with the parts in the position indicated in Fig. 6 that the ports 91 and 111 are completely out of registration, that the ports 93 and 113 are in full registration and that as the valve disc 100 is rotated in a counter-clockwise direction that the ports 93 and 113 cut off very gradually, since in any position of partial registration these ports are open and admit air through a port which has an area enclosed by two intersecting arcs of circles. During such rotation of the valve disc 100 in a counter-clockwise direction, the port 113 cuts off completely from registration with the port 93 somewhat ahead of the initiation of registration between the ports 111 and 91. When the latter ports thus come into registration, the interior of the valve casing 71 is very gradually subjected to vacuum conditions, since initiation of registration of these ports is initially through an area subtended by arcs of two circles and this area increases quite rapidly until the ports 91 and 111 are brought into full registration as illustrated in Fig. 9. If the brake pedal rod 36 is released and allowed to move in a direction opposite to that indicated by the arrow 37, the spring 82 will rotate the inertia member 106 and valve disc 100 in a counter-clockwise direction from the position indicated in Fig. 9, with the ports 111 and 91 decreasing in the area of registration at an accelerated rate. This causes the power actuator to have a smooth action since the suction ports 91 and 111 come into registration and cut off at an accelerated rate, insuring smoothness of operation at initiation of registration or completion of cut-off, thus eliminating jerky action or chattering of parts.

In applying brakes, the brake pedal rod 36 is first moved a slight distance in the direction indicated by the arrow 36, which causes the nut 43' to pick up the loop 45 of connecting link 46 and rotate the inertia member 106 and valve disc 100 in a counter-clockwise direction, as viewed in Figs. 1, 6 and 9. Port 111 is brought into registration with the port 91, admitting vacuum conditions to the interior of the casing while atmosphere is shut off and admitting vacuum conditions to the interior of the bellows 60 causing collapse of the latter, and rotating the main actuator lever 55 in a counter-clockwise direction, in order to apply the brakes to the link mechanism comprising the pivot 63, link 64, pivot 65, pivot 38, brake operating arm 35, cross-shaft 31, brake arms 32 and 33, and brake rod 34. If the brake pedal rod 36 is held in the position to which it has just been moved, the counter-clockwise rotation of the main lever 55 of the power actuator swings the valve casing 71 in a counter-clockwise direction about the pivot 56 as a center, which would allow the loop 45 of link 46 to move away from the nut 43' or lessen pressure thereagainst, so that the spring 82 would have a tendency to return the inertia member 106 and valve disc 100 back toward the position indicated in Fig. 6. It is also noted that application of the brakes causes deceleration of the vehicle so that the inertia member 106 also has a tendency to swing under the influence of its own inertia from the position indicated in Fig. 9 toward the position indicated in Fig. 6. This causes the port 111 to cut off from registration with reference to the port 91, but as long as the brake pedal is depressed does not allow the valve parts to move sufficiently to bring the port 113 into registration with the port 93 unless the brake pedal is completely released. If greater braking effect is desired, the brake pedal may be depressed still further, against causing the nut 43' to pick up the loop 45 of link 46 and again returning the valve parts to the position indicated in Fig. 9 and causing further exhaustion of the bellows 60. This again rotates the main lever 55 to a further counter-clockwise position, swinging the valve casing 71 so that spring 82 and the inertia member 106 can again cut off registration of the port 111 with the port 91. As will be appreciated, the construction thus provides a follow up valve construction permitting the amount of braking effect and the amount of exhaustion of the bellows 60 to be controlled in direct response to the amount the brake pedal is depressed. The cutting off of the registration of the vacuum ports 111 and 91 in response to counter-clockwise rotation of the main lever 55, as viewed in Fig. 1, allows the braking effort to be maintained at any desired value. Very smooth braking action is maintained in this manner.

It is also noted that when the bellows 60 is partially evacuated and maintaining the brakes in applied condition, that the bellows is a very flexible member and resiliently applies the force for maintaining the brakes in the desired applied condition. This promotes safety in the action of the brake applying mechanism, insuring smoothness of operation and absence of chattering or jumping in the brake action. It is also noted that during deceleration of the vehicle, the inertia of the inertia member 106 reacts back to the brake pedals through the valve operating arm 78, link 46, and nut 43 to the brake pedal rod 36 to give the vehicle operator a physical indication through the brake pedal of the amount of braking effect obtained.

Referring back to Fig. 1, it is noted that with the bellows 60 partially evacuated and the brakes applied, a shut-off valve 115, interposed in the flexible conduit, can be employed to maintain the brakes in applied condition for parking brake purposes. The valve 115 may be controlled by a Bowden wire operator 116 extending to a manual operator 117 mounted within convenient reach of the operator of the vehicle and rests for example upon the instrument panel, indicated at 118. The manual operator 117 is preferably provided with a notched flange 118' co-operable with a bolt 119 of a key lock 120 for locking the brake in applied condition when desired.

Reference may now be had to Figure 3 which shows the internal bracing construction employed in the bellows 60. The reinforcing means comprises pressed plates 121, each provided with a rolled margin 122 and a central opening 123 adjacent which a partially rounded flange 124 is pressed to stiffen and reinforce the plates. The bellows member 60 is of molded rubber and is thickened adjacent the outer peripheral margin 122 of each plate 121, as indicated at 125 on each side of the plate to form an annular, radially inwardly directed pocket for reception of the rolled edge 122 of each plate. In the bellows construction illustrated in Figure 1 five of such reinforcing plates 121 would be employed to prevent collapsing and buckling of the bellows. If desired, the contacting portions of the bellows 60 with the rolled peripheral margin 122 may be vulcanized to such rolled margins. However, the thickened portions 125 will serve to hold the plates 121 in position within the bellows member.

Referring to Figure 7, it is noted that the bearing boss 102 and upper surface margin of the fittings 90 and 92 are upwardly spaced from the base plate 83 to afford a sediment trap, so that dirt or foreign matter will not interfere with the valve action of the disc valve elements 100.

Reference may now be had to Figures 10, 11 and 12, which illustrate a modified form of power actuator, in which the brake pedal rod 36, knuckle connector 41, brake operating arm 35, and cross-shaft 31 are the same as the corresponding elements employed in the previously described embodiment. In the present modification, however, the loop 45' of the actuator link 46' for the valve means abuts the lock nut 44 instead of adjustable means threaded to the knuckle 41. In the present modification, the main lever of the power actuator, indicated at 55', is fixed at one end to the cross-shaft 31 and at its other end is pivotally connected by pivot 67' to the movable element 61' of bellows 60'. The fixed element of the bellows is indicated at 57', and is secured to the bracket 50', which is in turn mounted or otherwise rigidly connected to the frame of the automotive vehicle. An arm 130 is also rigidly connected at one end to the power shaft 31 and at its opposite end has a pivotal connection 131 for rotatably supporting the valve means. The valve means comprising the casing 132, includes a filter chamber 133 filled with a mineral wool or similar filtering material and provided with an air vent 134 and a cylindrical valve chamber 136 provided with a sleeve 137. The sleeve 137 is fixed in the casing and through the sleeve is provided an air port 138 and a suction port 140 communicating with the conduit 88' which leads to a suitable source of suction as in the previously described embodiment. A valve segment 141 is rotatably mounted within the sleeve 137 and fixed to a shaft 142 journalled in the casing 132. Also fixed to the shaft 142 externally of the casing 132 is an operating arm 143 pivotally connected at 144 to a link 145 which makes a pivotal connection at its other end to an ear 146 integral with the main lever 55' of the power actuator. An ear 147 is made integral with the casing 132 and pivotally connected at 148 to the link 46' for swinging the valve casing 132 about the pivot 131 as a center to cause rotation of the valve segment 141.

Movement of the brake pedal rod 36 to the left, as indicated in Fig. 10, causes the lock nut 44 to pick up the loop 45' of link 46', which in turn causes counterclockwise rotation of the valve casing operating arm 147 and the valve casing 132 about the pivot 131 as a center. Since the ear 146 is stationary with reference to the main link 55', this causes the segment operating arm 143 and segment 141 to be rotated in a counterclockwise direction from the normal position indicated in Fig. 11 to the operating position indicated in Fig. 12. The segment 141 covers either or both of the ports 138 and 140 in order to subject the valve chamber 136 to atmospheric conditions, to the vacuum conditions of the conduit 88′ or to maintain vacuum conditions within the chamber 136 when the valve segment 141 covers both ports 138 and 140. The conduit 87′ connects the interior of the valve chamber 136 with the interior of the bellows 60′. In this embodiment, the weight of the casing 132 and parts contained therein serve as the inertia member, tending to rotate in a clockwise direction about the pivot 131 during deceleration of the automotive vehicle, so that the ear 146 fixed relative to the main lever 55′ and the link mechanism 145, 144, and 143 will rotate the valve segment 141 so as to close the suction port 140 and open the ports 138, leading to atmosphere through the air cleaner. It is noted that in this modification, as well as in the previously described embodiment, that depression of the brake pedal causes rotation of the movable valve elements so as to cause the latter to admit vacuum conditions within the valve chamber and cut off atmosphere therefrom which will cause collapse of the bellows member and rotate the main lever 55′ and rotation of the latter will, through the link mechanism 146, 145, 144, and 143 render inoperative the pull of the link 46 and allow the valve casing to swing toward its normal position, indicated in Fig. 11, in order to cut off registration between the port 140 and the interior of valve chamber 136 and maintain the vacuum conditions within the bellows 60′. Further depression of the pedal will again admit vacuum conditions from the vacuum source to the interior of the bellows, causing further collapse of the latter and further application of the brakes, and if the brake pedal is maintained at the further depressed point, the port 140 will again be closed. Release of the brake pedal will allow the parts to return to the position indicated in Figure 11.

The bellows construction indicated in Figure 10 provides substantially the same result as the bellows construction previously described except that the reinforcing rings 149 are flat in this case, positioned on the outer side of the bellows, and are imbedded within the annular flange-like radial extensions or fins 149′ formed integrally with the molded rubber bellows member.

Reference may now be had to Figures 13 to 18, inclusive, which show a further modified form of valve means and control and operating means therefor. In this embodiment, the brake pedal rod 36, knuckle 41, lock nut 44, brake cross-shaft 31, and operating arm 35 therefor, are the same as in the previously described embodiment. A bracket 150 is bolted, or otherwise rigidly secured, to a chassis frame member 130, and has secured thereto a valve casing, indicated generally by the numeral 151, by means of bolts 152. A main lever 155 for the power actuator is pivotally mounted upon the bracket 150 by means of a pin 155′ axially aligned with the shaft 31, and this lever 155 has integrally formed therewith a short power arm 162 provided with a laterally extending lug 153 adapted to abut and rotate the brake operating arm 35 in a clockwise direction, as viewed in Figure 13, when the main lever 155 of the power actuator is rotated in a counter-clockwise direction. The free end of the power arm 162 of lever 155 has pivotally connected thereto a link 154, the opposite end of which is connected by means of a link 156 to a valve operating arm 157. A link 160, corresponding with the links 46 and 46′ of the previously described embodiment, is pivotally connected to the link 154 at a point intermediate the length of the latter for initiating operation of the valve mechanism.

The valve casing 151 comprises a base plate 161 and a cover member 163, in which are journalled a pair of roller members 164 and 165 operably connected by means of a belt 167. As indicated in Figures 17 and 18, the belt 167 comprises an endless steel tape core coated with rubber or similar composition. The roller 164 constitutes the valve element in conjunction with the flexible tape 167 and includes an air passage 168 extending axially to partly less than one-half the length of the roller and thence to the approximate center of the periphery of the roller. A similarly formed vacuum passage 170 is also provided in the roller 164, the non-axially extended portions of the passages 168 and 170 being at an angle of less than 180° with reference to each other, as indicated in Figure 15. The roller 165 simply acts as a guide and drive drum for the roller 164. The air passage 168 communicates with the atmosphere through an air cleaner 171 and the passage 170 communicates with a conduit 188 leading to a suitable source of suction, as in the previously described embodiment. A flexible tubing 187 communicates with the interior of a power bellows, as previous described.

Figure 15 indicates the normal position of the valve means and Fig. 16 the operating position thereof. Movement of the brake pedal rod 36 to the left, as viewed in Fig. 15, causes the lock nut 44 to first pick up the link 160, which swings the link 154 about its pivotal connection to the power arm 162 of the power actuator main lever 155 and through link 156 rotates the valve operating arm 157 in a counter-clockwise direction. This rotates the drums 165 and 164 in a counter-clockwise direction, as viewed in Figures 14, 15 and 16, to the position indicated in Figure 16, causing the belt 167 to close the air passage 168 and uncover the suction passage 170, so as to cause the bellows member to be under the influence of suction conditions. This will rotate the main lever 155 of the power actuator in a counter-clockwise direction and rotate the power arm 162 of this lever in the same direction and through the lug 153 thereon, rotate the brake operating arm 35 to apply the brakes. It is noted, however, that the rotation of the power arm 162 moves the pivotal connection between this power arm and the link 154 to the left, as indicated in Figure 15, and slackens the tension on the link 160, which allows the valve parts to return toward the position indicated in Figure 15. The valve parts, however, return but part way toward the normal position, so that both passages 170 and 168 are closed by the belt 167. Further depression of the pedal will again uncover the suction passage 170 and movement of the arm 155 will again close such passage if the brake pedal is held at this point of advance. Release of the valve pedal will allow the valve parts to return to the position indicated in Figure 15.

Reference may now be had to Figures 19 to 21, inclusive, which illustrate a gravity and inertia operated valve for controlling the application of vacuum or suction conditions to a servo-motor or a power brake system. This construction is particularly adapted to truck practice. In Figure 19, the numeral 172 indicates an internal combustion engine, provided with an intake manifold 173, indicative of any suitable vacuum source operable in response to operation of the internal combustion engine. This source of suction is connected by the conduit 174 to a rotary valve means comprising a casing 175 and a rotary cylindrical valve element 176. The casing 175 is preferably made integral with a cylinder 177 of a servo-motor, a port 178 connecting the interior of the valve casing 175 with the interior of cylinder 177. A shaft 180 is fixed to the rotary valve element 176 and extends through the casing 175. To this shaft exteriorly of the casing 175 is fixed a pendulum-like member 181, which when the automotive vehicle is at rest or travelling at a uniform speed along the level, assumes the position indicated by Figures 19 and 20. Adjusting screw 182 and lock nut 183 are employed as an adjustable limiting stop for preventing counter-clockwise rotation beyond the position indicated by Figures 19 and 20. The opposite side of the pendulum member 181, with respect to the adjustable stop 182, is engaged by a spring 184, the tension of which may be adjusted by a screw 185 threaded through a bracket 186 fixed to the cylinder 177. A flexible operator 190 connects the adjusting screw 185 to an operating handle 191 mounted within easy reach of the operator of the vehicle, as for example on the vehicle instrument panel, indicated at 193. An angular passage 192 is provided in the rotary valve element 176 at such an angle that with the pendulum member 181 in the position indicated in Figures 19 and 20, the passage 192 is barely in communication with the port 178 and the port 194 leading to the vacuum conduit 174. The adjustable stop 182 just contacts the pendulum member 181 when the latter is in this position. The amount of air which can be drawn through the passage 192 with the parts in the indicated position is virtually the same as the leakage between the cylinder 177 and its piston, so that vacuum conditions created by the internal combustion engine will not operate the brakes of the vehicle. If, however, the vehicle is travelling down grade or is retarded, gravity or deceleration of the vehicle, or both, will cause the pendulum member to swing toward the position indicated by Fig. 21, opening the passage 192 more fully and more completely subjecting the interior of the cylinder 177 to vacuum conditions, in order to obtain increased brake application. The ease with which the pendulum 181 can swing toward the position indicated in Fig. 21 may be adjusted by means of the manual operator 191, which can be employed to regulate the pressure exerted on the pendulum member 181 by the spring 184.

Figure 22 shows a modification of the valve construction illustrated in Figs. 19 to 21 and differs therefrom mainly in that a straight passage 192' is bored through the rotary valve element 176' and the port 178' communicates with the servo-motor means.

As many changes could be made in the above construction, and many apparently widely different embodiments of this invention could be had without departing from the scope thereof, it is intended that all matter contained in the above description or shown in the accompanying drawings shall be interpreted as illustrative and not in a limiting sense.

What is claimed is:

1. In power operating mechanism for brake means of an automotive vehicle including a frame, a source of suction, manual brake operating means, a lever pivoted intermediate its ends at a point stationary relative to said frame, a bellows having a pair of end elements one movable and the other stationary relative to said frame, said movable element being connected to one end of said lever, the opposite end of said lever being connected to said manual brake operating means, a valve means carried by said lever, means connecting said manual brake operating means to said valve means for connecting said source of suction to said bellows for evacuating the same and cause rotation of said lever and application of said brake means, and an inertia member, said valve means being operable in response to rotation of said lever to shut off communication between said source of suction and said bellows, and said inertia member being operable in response to deceleration of the vehicle to operate said valve means so as to cut off communication between said source of suction and said bellows.

2. In power operating mechanism for brake means of an automotive vehicle including a frame, a source of suction, manual brake operating means, a lever pivoted intermediate its ends at a point stationary relative to said frame, a bellows having a pair of end elements, one movable and the other stationary relative to said frame, said movable element being connected to one end of said lever, the opposite end of said lever being connected to said manual brake operating means, a valve means carried by said lever, an inertia member for operating said valve means, means for connecting said manual brake operating means to said inertia member for operating said valve means so as to connect said source of suction to said bellows for evacuating the same and causing rotation of said lever, said valve means being operable in response to rotation of said lever to cut off communication between said source of suction and said bellows, and said inertia member being operable in response to deceleration of the vehicle for operating said valve means to cut off communication between said source of suction and said bellows.

3. In power operating mechanism for brake means of an automotive vehicle including a frame, a source of suction, manual brake operating means, a lever pivoted intermediate its ends at a point stationary relative to said frame, a bellows having a pair of end elements, one movable and the other stationary relative to said frame, said movable element being connected to one end of said lever, the opposite end of said lever being connected to said manual brake operating means, a valve means carried by said lever, means connecting said manual brake operating means to said valve means for connecting said source of suction to said bellows for evacuating the same to rotate the said lever, and a shut off valve means adjacent said bellows for cutting off communication between said source of suction and said bellows for parking brake purposes.

4. In power operating mechanism for brake means of an automotive vehicle including a frame, a source of suction, manual brake operating means, a lever pivoted intermediate its ends at a point stationary relative to said frame, a bellows having a pair of end elements, one movable and the other stationary relative to said frame, said movable element being connected at one end to said lever, the opposite end of said lever being connected to said manual brake operating means, a valve means carried by said lever, means connecting said manual brake operating means to said valve means for connecting said source of suction to said bellows for evacuating the same to rotate said lever and apply the brakes of a vehicle, a shut-off valve adjacent said bellows for cutting off communication between said source of suction and said bellows, a manual operator extending to a point remote from said bellows for operating said last named valve.

5. In power operating mechanism for brake means of an automotive vehicle including a frame, a source of suction, manual brake operating means, a lever pivoted intermediate its ends at a point stationary relative to said frame, a bellows having a pair of end elements, one movable and the other stationary relative to said frame, said movable element being connected to one end of said lever, the opposite end of said lever being connected to said manual brake operating means, a valve means carried by said lever, means connecting said manual brake operating means to said valve means for connecting said source of suction to said bellows for evacuating the same to rotate said lever and apply the brakes of the vehicle, a shut-off valve adjacent said bellows, a manual operator for said shut-off valve extending to a point remote from said bellows for shutting off said valve to cut communication between said source of suction and said bellows for parking brake purposes, and lock means cooperating with said manual operator for maintaining said shut-off valve in closed position.

6. In power operating mechanism for brake means of an automotive vehicle including a frame, a source of suction, manual brake operating means, a lever pivoted intermediate its ends at a point stationary relative to said frame, a bellows having a pair of end elements, one movable and the other stationary relative to said frame, said movable element being connected to one end of said lever, the opposite end of said lever being connected to said brake operating means, a valve means operable in response to rotation of said lever, means for connecting said manual brake operating means to said valve means for connecting said source of suction to said bellows for evacuating the same to rotate said lever and apply the brakes of the vehicle, said valve means including a casing and a valve element therein, said casing and contained parts constituting an inertia member operable in response to deceleration of the vehicle for cutting off communication between said source of suction and said bellows.

7. In power operating mechanism for brake means of an automotive vehicle, a source of suction, a rotary valve means rotatable about an axis transverse to the length of the vehicle, manually controlled means for effecting operation of said valve, a servo-motor, conduit means communicating between said source of suction and said valve, a passage between said valve and said servo-motor, and gravity and inertia operable means connected to said rotary valve means for varying the communication between said source of suction and said servo-motor as initially established by said manually controlled means.

8. In power operating mechanism for brake means of an automotive vehicle, a source of suction, a rotary valve means rotatable about an axis transverse to the length of the vehicle, manually controlled means for effecting operation of said valve, a servo-motor, conduit means communicating between said source of suction and said valve, a passage between said valve and said servo-motor, gravity and inertia operable means connected to said rotary valve means for varying the communication between said source of suction and said servo-motor as initially established by said manually controlled means, and an adjustable stop means for limiting movement of said gravity and inertia operable means in one direction.

9. In power operating mechanism for brake means of an automotive vehicle, a source of suction, a rotary valve means rotatable about an axis transverse to the length of the vehicle, manually controlled means for effecting operation of said valve, a servo-motor, conduit means between said source of suction and said valve, a passage between said valve and said servo-motor, gravity and inertia operable means connected to said rotary valve means for varying the communication between said source of suction and said servo-motor as initially established by said manually controlled means, and resilient and adjustable means for resisting movement of said gravity and inertia operable means in one direction.

10. In power operating mechanism for brake means of an automotive vehicle, a source of suction, a rotary valve means rotatable about an axis transverse to the length of the vehicle, a servo-motor, conduit means communicating between said source of suction and said valve, a passage between said valve and said servo-motor, gravity and inertia operable means connected to said rotary valve means for controlling communication between said source of suction and said servo-motor, an adjustable stop for limiting movement of said gravity and inertia operable means in one direction, and resilient means for resisting movement of said gravity and inertia operable means in the opposite direction.

11. In power operating mechanism for brake means of an automotive vehicle, a source of suction, a rotary valve means rotatable about an axis transverse to the length of the vehicle, a servo-motor, conduit means communicating between said source of suction and said valve, a passage between said valve means and said servo-motor, gravity and inertia operable means connected to said rotary valve means for controlling communication between said source of suction and said servo-motor, resilient means for resisting movement of said gravity and inertia operable means in one direction, adjustable means for regulating the resistance of said resilient means, and manually operable means for said adjusting means extending to a point remote from said servo-motor for regulating the resistance of said resilient means.

GILBERT E. PORTER.